July 14, 1931.  C. J. JORDAN  1,814,932
METHOD AND APPARATUS FOR DRAWING, CUTTING,
GRIPPING, AND CONVEYING SHEET PLATE GLASS
Filed Nov. 23, 1928    5 Sheets-Sheet 2
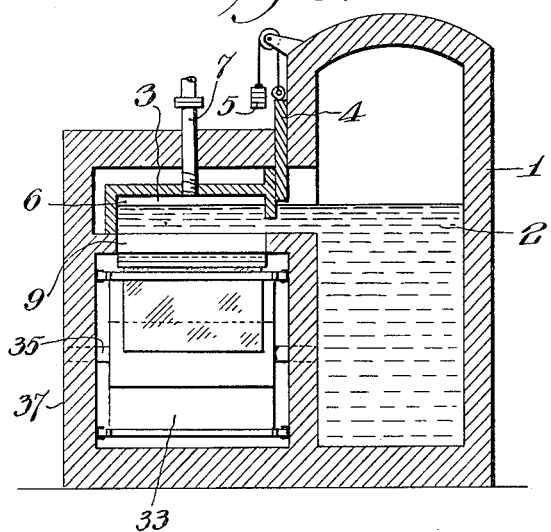
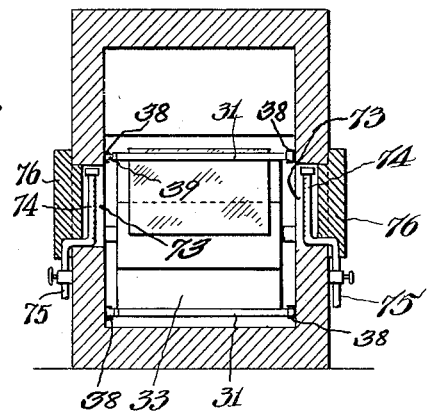
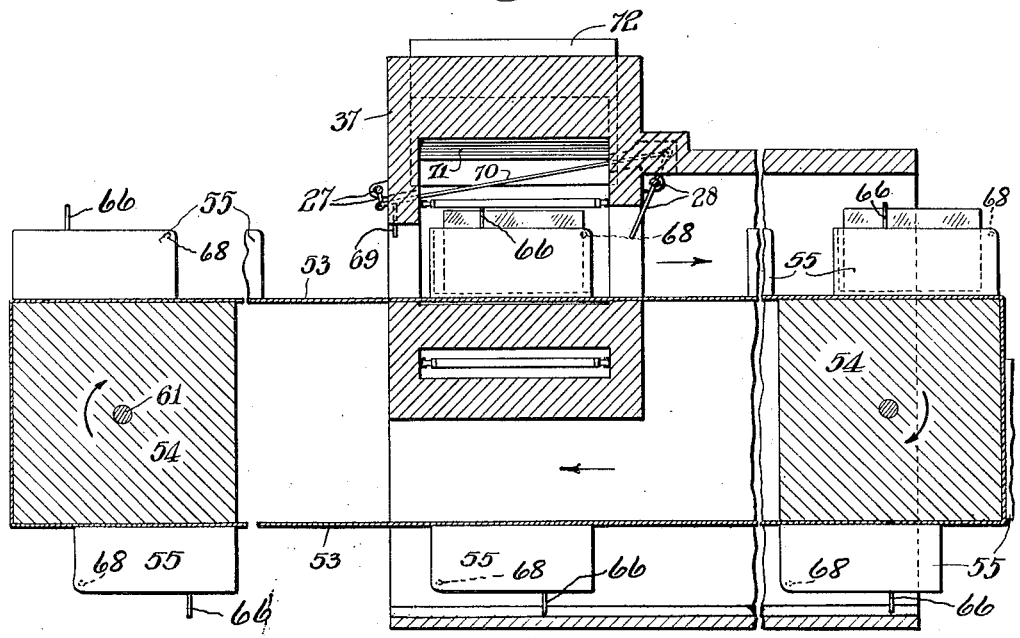
Charles J. Jordan, INVENTOR
BY Victor J. Evans
ATTORNEY

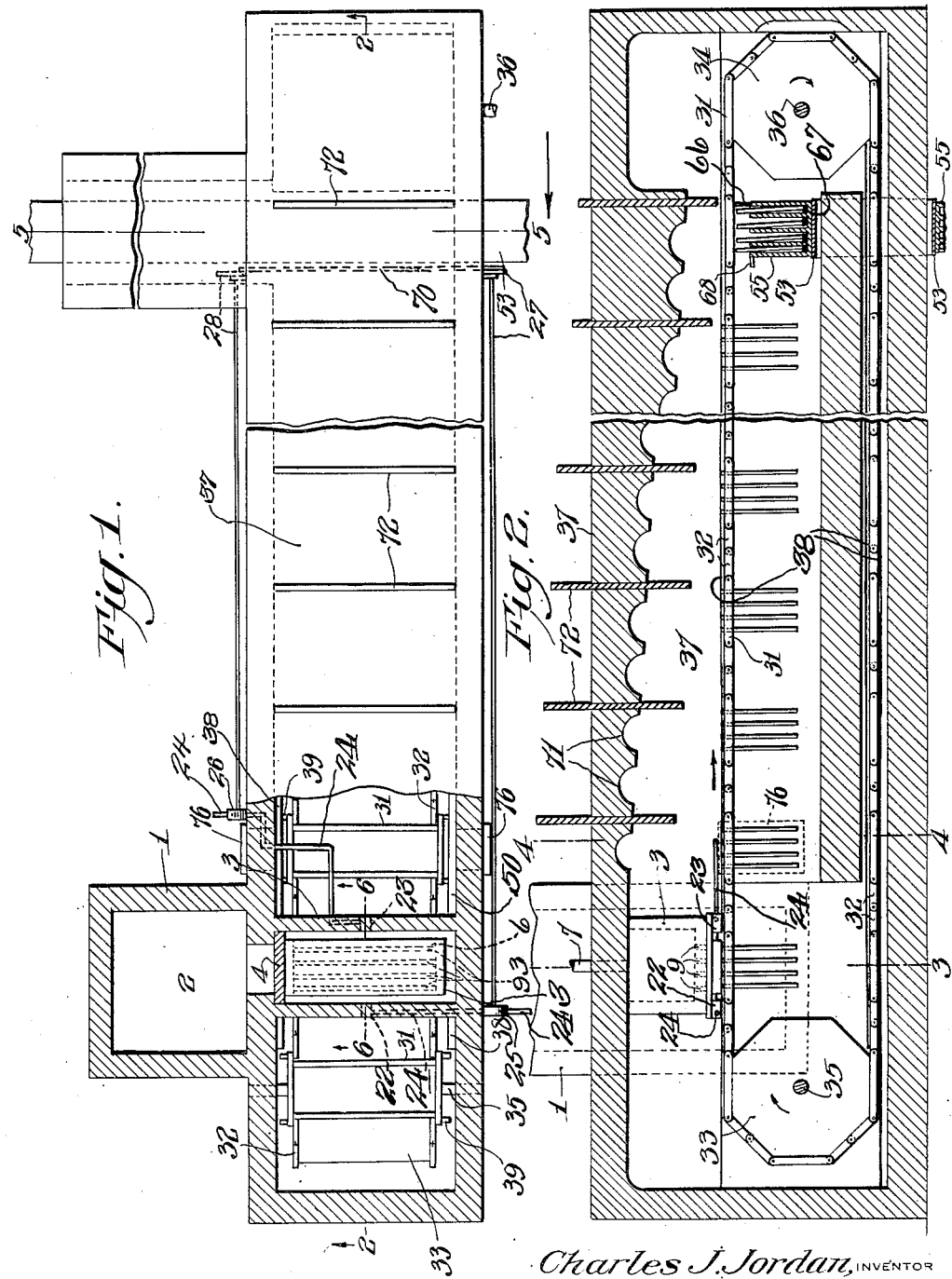

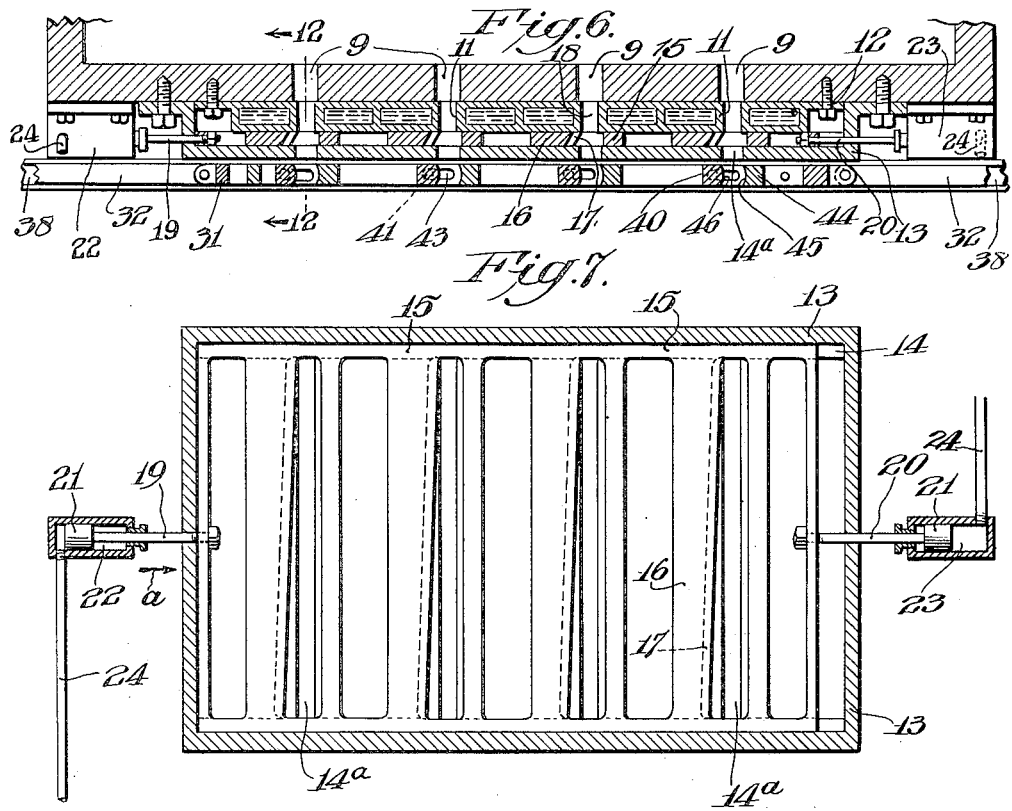
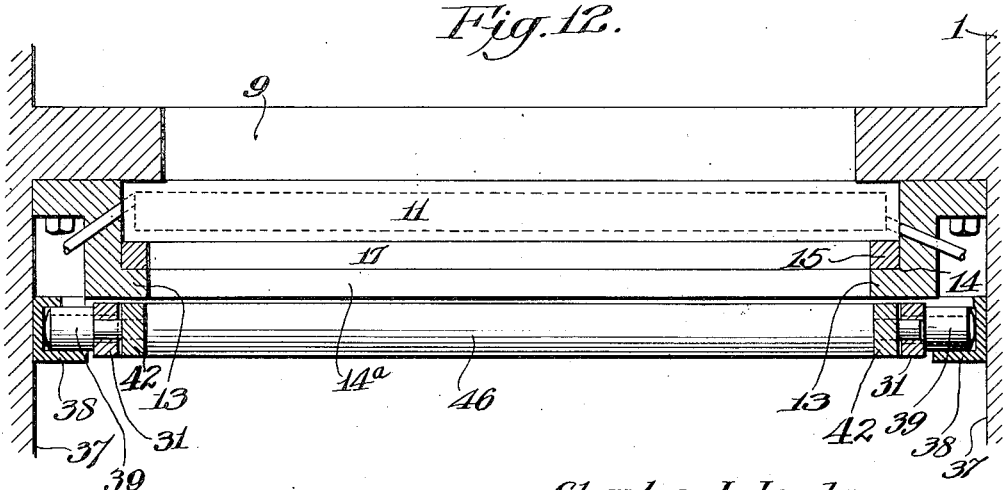

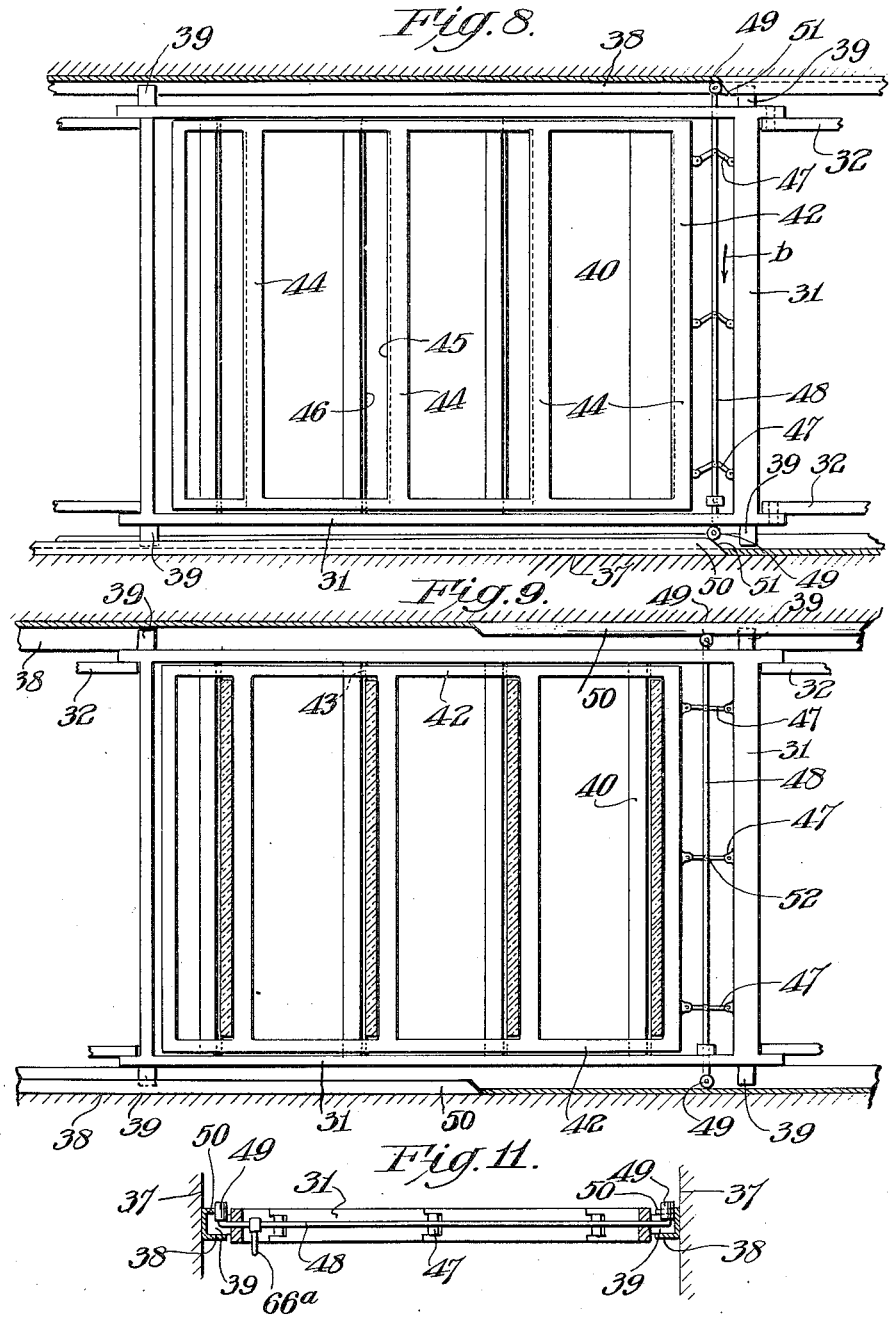

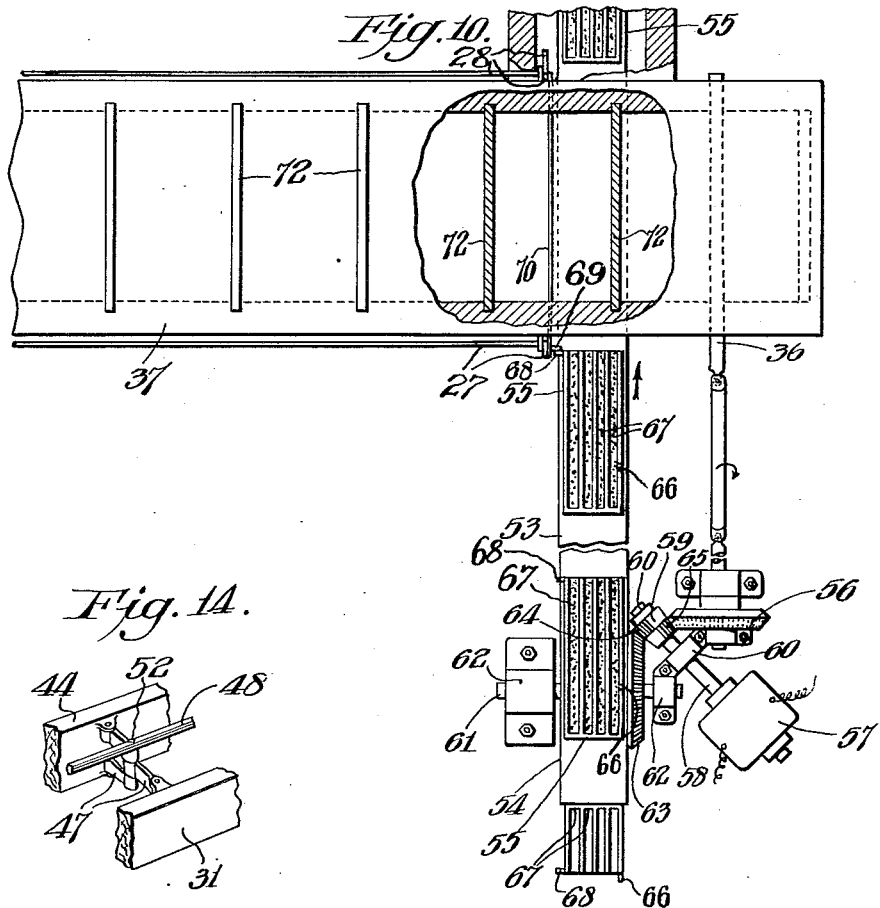
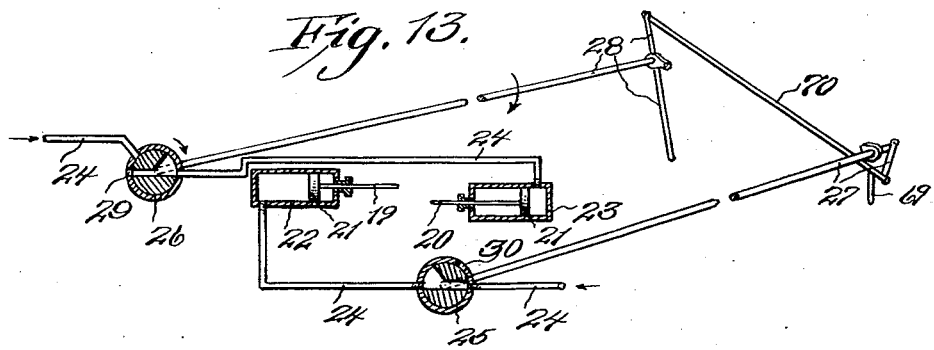

Patented July 14, 1931

1,814,932

UNITED STATES PATENT OFFICE

CHARLES J. JORDAN, OF WOODBURY, NEW JERSEY, ASSIGNOR OF ONE-FOURTH TO RUDOLPH D. SCHAUB, OF WOODBURY, NEW JERSEY

METHOD AND APPARATUS FOR DRAWING, CUTTING, GRIPPING AND CONVEYING SHEET PLATE GLASS

Application filed November 23, 1928. Serial No. 321,397.

The present invention relates to an improved method and apparatus for drawing, cutting, gripping and conveying sheet plate glass, especially adapted for use in connection with the apparatus for manufacturing fire-polished sheet glass disclosed in the United States patent issued to Charles J. Jordan July 10, 1928, Patent No. 1,677,095, wherein the glass is forced from a discharging pot of a furnace by means of air under pressure, allowing the molten glass to be drawn from under the skim, thereby avoiding the necessity of skimming the molten glass in the furnace.

In the patent above identified the glass extrudes through a passage in the under wall of the pot, and as it extrudes or discharges, it chills relatively sufficient, so that the glass can be substantially handled.

It is therefore the purpose of the present invention to use this improved glass handling apparatus so that the glass being extruded from the apparatus in said patent may be drawn below the skim in the pot, thereby producing a relatively very clear glass, without the necessity of skimming the surface of the molten glass in the pot.

Another purpose is to provide means for cutting the glass as it extrudes or draws from the slot.

Another purpose is to provide means for gripping the glass subsequently to it being severed, the construction and arrangement of the gripping and cutting means being such as to permit the irregular edge and the gripped portion of the glass to be removed, after the sheets of glass have been conveyed to a point where the sheets are to be otherwise treated or handled.

Another purpose is to provide means for conveying the sheets of glass to any location, and while being so transmitted the glass passes through an annealing furnace, allowing the sheets of glass to gradually cool off and properly season by the time that they reach a location beyond the apparatus, where the sheets of glass may be otherwise handled and the edges made relatively smooth and ready for packing and to be shipped.

Still another purpose is to arrange the cutting and gripping means close to the extruding passages from which the glass is drawn, so that the glass may be cut and gripped with the least possible waste, such waste being returnable in any manner not shown to the molten glass in the furnace.

A further purpose is to provide an apparatus of this kind, whereby a plurality of sheets of glass may be constructed at one time, the entire number of sheets being cut and gripped at one time respectively, it also being a purpose of the invention to utilize compressed air operating means to impart movement to the cutting member of the severing mechanism.

A still further purpose is to provide means to automatically actuate the gripping means to automatically grip the glass after it is cut, and then automatic means to automatically release the glass, at a point where the glass may be otherwise handled.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a plan view of an annealing furnace partly in section, showing the same adapted for use in connection with the furnace of the apparatus disclosed in the above identified patent.

Figure 2 is a longitudinal sectional view on line 2—2 of Figure 1, showing the annealing furnace in section, showing how the sheets of glass are first cut, gripped and then conveyed through the annealing furnace and illustrating how the sheets may be gradually cooled off.

Figure 3 is a cross sectional view on line 3—3 of Figure 2.

Figure 4 is a sectional view on line 4—4 of Figure 2.

Figure 5 is a sectional view on line 5—5 of Figure 1.

Figure 6 is an enlarged detailed sectional view on line 6—6 of Figure 1, of a portion of the bottom wall of the pot, showing the extruding or discharging openings with the cutting and gripping means in section.

Figure 7 is an enlarged detailed plan view of the cutting or severing device.

Figure 8 is a plan view of the glass gripping device showing the grippers in the act of being actuated to grip the glass.

Figure 9 is a plan view showing the glass gripped.

Figure 10 is an enlarged view of one end of the annealing furnace showing the mechanism for actuating two conveyors, one at right angles to the other, one conveying the sheets of glass through the annealing device, the other conveying the glass from the annealing furnace, the two conveyers being operated in rhythm but intermittently.

Figure 11 is an enlarged detailed view showing the releasing mechanism for the gripping means.

Figure 12 is a sectional view on line 12—12 of Figure 6.

Figure 13 is a diagrammatical view of the operating mechanism for the valves 25 and 26.

Figure 14 is a detailed perspective view of the parts 47, 48 and 52, which operatively connect the elements 31 and 44.

Referring more especially to the drawings, 1 identifies a glass making furnace of any approved type and adapted to contain molten glass as at 2 and 3 is a discharging pot which communicates as shown with the interior chamber of the furnace 1, whereby the molten glass may flow into the pot to a level as disclosed in Figure 3. The flow of glass into the pot 3 is controlled by the gate 4, being balanced by the weight 5, the gate being capable of movement vertically. This construction is clearly set up and claimed and illustrated in the United States Letters Patent heretofore mentioned. The pot 3 may be any shape and size, preferably rectangular, the interior of the pot having an air dome 6, which opens downwardly. An air supply pipe 7 connected to the crown of the dome 6, admits air under pressure into the pot to force the molten glass from the longitudinal slots 9. The fact is the glass is drawn into a sheet from the under portion of the molten glass, that is under the skim, thereby allowing the glass to be drawn into sheets, which are relatively clear.

The slots or passages 9 are spaced from each other, and disposed adjacent thereunder are members 11, which are hollow and contain a suitable cooling fluid as indicated in the drawing, for the purpose of chilling the glass as it extrudes or issues from the slots. These members may be adjustable as in the Patent No. 1,677,095 to regulate the width of the glass issuing from the slots.

Arranged on the under surface of the pot and in close position to the members 11 is a frame 13, which also has openings or slots 14a. This frame 13 has guides 14 for the reception of an auxiliary frame 15, which has transverse knives 16 with beveled cutting edges 17. The knives move closely adjacent and engage with the under surface of the members 11, so that the cutting edges 17 will move across the openings or passages 18 between the members 11 for the purpose of shearing off the sheets of glass as they are drawn. The beveled cutting edges are disposed on slight angles or rather inclined as shown in Figures 6 and 7, so as to insure a shearing action on the glass.

The auxiliary frame 15 having the shearing knives 16 is operated through the medium of the piston rods 19 and 20 and their pistons 21, the latter being mounted in compressed air cylinders 22 and 23, there being pipes 24 for conducting compressed air from any suitable source not shown into the cylinders. These pipes are provided with valves 25 and 26 to be automatically controlled as hereinafter set forth, in order to permit air to enter the cylinder 22 to actuate the piston rod 19, and to shut off air to the cylinder 23. For example the valves 25 and 26 have their stems so disposed as to be intermittently actuated in a manner as hereinafter disclosed, that is tilted so that the valve 25 can be opened and the valve 26 closed. When the valve 25 is open compressed air is allowed to enter the cylinder 22 in the rear of the piston 21 and actuate the rod 19 to move the frame 15 and the shearing knives 16. As the frame 15 with the shearing knives is moved, the utilized compressed air in the cylinder 23 is expelled to allow the rod 20 to move. At the same time the utilized compressed air is shut off to the cylinder 23. The frame 15 with the shearing knives may be reversed in its movement by admitting compressed air into the cylinder 23 behind its piston 21, and at such time the utilized compressed air in the cylinder 22 has expelled. The expelling of compressed air in these cylinders is accomplished through the outlet openings 29 and 30.

Operable below the frame 13 is a plurality of frames 31, which are joined together by links 32, thereby causing to be formed an endless carrier, which travels about polygonal shaped gears or wheels 33 and 34 mounted upon the shafts 35 and 36. This carrier is operable in an annealing furnace 37, one end of which houses the pot 3 and is made a part of the glass making furnace 1, as shown in Figure 1. This annealing furnace may be any shape and proportions, and is preferably of substantial length, so as to insure a very gradual annealing of the glass plates as they are conveyed or carried through it. Each of the frames 31 of the endless carrier travels in guides 38 at the top and bottom of the annealing furnace. The annealing furnace and the furnace 1 and the pot 3 may be constructed of any suitable masonry and are designed to have heavily constructed walls. Also each of the frames 31 have rollers 39 engaging in the guides 38.

Mounted in the sides of each of the frames 31 are fixed clamps or grippers 40, the reduced extremities or pintles 41 of which are engaged in bearings of the sides of each frame 31. The frames 31 are rectangular and may be any proportions. Corresponding in shape to and of less length than the frames 31, and of a width to slidably fit within said frames 31 are movable frames 42. Each of the frames 42 has its sides provided with slots 43, through which the fixed grippers or clamps 40 engage in order to act as guides for the slidably movable frames 42. Each of the frames 42 has transverse bars 44. The transverse bars 44 and the fixed grippers or clamps 40 have their adjacent edges concaved and convexed respectively as shown at 45 and 46, the concavity and convexity of such edges being transversely of the bars and the grippers or clamps 44 and 40. Said concaved and convexed edges being adjacent each other and normally disposed equal to the width of the openings or passages 14a in the frame 13, so that when the sheets of glass are issuing through and from the slots or openings 9 and between the members 11 and through the slots or openings 14a, the spacing of such edges will be such as to permit the glass as being drawn to pass between the edges and then be substantially gripped, due to the automatic actuation of the movable or sliding frames 42.

In order to actuate the movable frames 42 so as to cause the concaved and convexed edges of the bars to grip the glass, toggle links 47 connect between said adjacent ends of the frames 31 and 42, as shown clearly in Figures 8 and 9. A reciprocating rod 48 is guided in the side bars of the frame 31 and have rollers 49 at its ends. These rollers engage the opposite side walls of the annealing furnace, that is they ride upon tracks 50. These tracks are above the guides 38, especially the upper guides 38. The rod 48 is connected to the pivots between the toggle links, so that when the rod 48 is moved in one direction, the toggle links will move or straighten from the position shown in Figure 8 to the positions shown in Figure 9, causing a reciprocating movement to be imparted to the frame 42, whereby the concave edges of the bars of said frame 42 may grip against the glass, and thereby hold it against the convexed edges of the bars 40. This gripping action takes place at a time when the glass has dropped a distance not greater or less than the combined thickness of the knives 16 and the frame 13, so as to permit the frames 31 of the carrier to pass from under the frames 13. It is to be understood that should the upper edges of the sheet glass project above the grippers or clamps, when the glass is cut and gripped, the glass at the upper edges will remain soft enough to wipe or break off as the frames 31 of the carrier travel, in carrying the sheets of glass through the annealing furnace. In order that the rod 48 may be moved the tracks 50 have cams 51, with which the rollers 49 engage, moving the rod in the direction of the arrow $b$, hence straightening the toggle links to the positions as on Figure 9. The toggles links are moved a slight distance beyond aligning positions, when moved in the direction of the arrow $b$, and their pivoted ends have shoulders 52 which engage each other, to limit the movement of the links and thereby keep the sheet plate glass gripped. The sheets of glass remain gripped in this manner until each group reaches a position at the far end of the annealing furnace at a point from which they are to be conveyed or carried laterally and from the annealing furnace.

The carrier comprising the frames 31 is operated intermittently with a laterally movable carrier 53 and vice versa. The transverse carrier 53 is disposed transversely of the far end of the annealing furnace and operates over suitable polygonal wheels or gears 54. This transverse carrier is provided with glass plate receiving containers 55, and while the carrier 53 is at rest the carrier which has the frames 31 is moved, and while the latter is at rest, the carrier 53 is moving.

The shaft 36 of the carrier having the frames 31 is extended beyond one of the sides of the annealing furnace, as shown in Figure 10 and is mounted in suitable bearing and provided with a beveled gear 56. In order to operate the gear 56 and the shaft 36 an electric motor or other suitable driving means 57 is provided, and its shaft 58 is provided with a gear 59. The shaft 58 is mounted in bearings 60 and in bearings of the frame of the motor, which receives energy from any suitable source not shown. As shown in Figure 10 the sprocket 54 on which the carrier 53 operates is mounted upon a shaft 61, which in turn is mounted in bearings 62. The shaft 61 has a beveled gear 63, which is of a diameter suitable to associate with the gear 56, in order to move the carrier 53 a greater movement, than the carrier which comprises the frames 31, so that when the drawn glass plates are released and allowed to drop in the containers 55, the containers will move sufficiently beyond the position of the next group of glass plates, in order to permit such next group of glass plates to assume a position to be carried laterally. In order to impart movements to the gears 56 and 63, a gear 59 which has two sets of teeth 64 and 65 is provided. As shown in Figure 10 one set of teeth 64 are just in the act of meshing with the gear 63, while the teeth 65 are just in the act of disengaging the teeth of the gear 56. The teeth 64 and 65 of the gear 59 are in such numbers as to operate the gear 63 in order that the carrier 53 will move intermittently, each movement being a trifle more than twice the width of the glass plates, so that the containers 55 will move out of the path of the next group of plates. The teeth 65 of the gear 59 are to be in such numbers as to operate the gear 56 intermittently and sufficiently, to operate the carrier having the frames 31, so that each frame will move in register with the slots or passages 14a and at the same time positioning the groups of glass plates in register to be received in the containers. The lower ends of the containers at one side thereof are provided with upstanding yieldable fingers 66, which project upwardly from the containers and properly located in order to engage with the toggle links 47 at one side of each frame 31, and sufficiently to return the frame 42 to its initial position and thereby releasing the glass plates, which will drop into the compartments of the containers 55. The drop of the glass plates is but a trifle, therefore there is no chance of the plates breaking, chipping or cracking in any way. To insure against such breaking or cracking the bottoms of the compartments of the containers may have felt padding 67.

The construction and arrangement of the gearing between the carriers is to be such as to permit the carrier having frames 31 to pause sufficiently to enable the glass to extrude or draw through the openings 9 and thereby cut between severing knives 16 and gripped, and while this pausing is taking place a group of glass plates is being conveyed or carried laterally. The construction and arrangement of the gearing between the two carriers is such that while the carrier 53 is at rest, the carrier having the frames 31 is moving, in order to place one of the frames 31 in proper position relative to drawing opening 9 and positioning another group of glass plates in readiness to be carried laterally.

At the time the carrier 53 starts to move in order to permit the glass plates to enter the compartments, the carrier with the frames 31 has reached its position with the space between the grippers or bars 40 and 44, and at such time compressed air, by any suitable means not shown, is allowed to enter the pot 3 sufficiently to cause a drawing of molten glass through the slots or openings 9, and through the openings or passages 14a and between the grippers, and by the time sufficient glass has been drawn from under the skim in the pot to make a requisite length of plates, a tripping device 68 on the carrier 53 engages with a projection 69 on a connector 70 (which connects the stems 27 and 28 of the valves 25 and 26) opening the valve 25 and closing the valve 26, which allows air to enter the cylinder 22 and shuts off air to the cylinder 23, thereby actuating the frame 15 and causing the knives 16 to shear the glass. It will be noted that the stem 28 is extended beyond the valve 26 on its opposite side, and by the time the shearing knives 16 have completed their cutting stroke the tripping device 68 engages with the longer end of the stem and moves the valve 26 back to its open position and closing the valve 25, allowing air to enter the cylinder 23 to act against the piston 21 and move the rod 20 and the movable frame 15 back to its initial position.

As previously stated the drawing glass issuing from the openings 9 and the passages 14a, drop just sufficiently to permit the grippers 40 and 44 to grip the glass, in such a manner as to avoid leaving parts of the upper edge of the glass projecting. This gripping action takes place a trifle before the carrier with the frames 31 starts to move. In other words the connecting rod 48 is moved by the cam 51 to cause the gripping action at the proper time, and then the carrier with the frames 31 starts moving, and at such time the carrier 53 is brought to a rest.

These operations consecutively repeat as the plate glass is drawn and allowed to be issued, cut, gripped and conveyed through the annealing furnace, and then conveyed laterally.

It will be noted that the top wall of the annealing furnace has its under surface inclined toward the far end of the furnace, and the surface of the top wall has transverse corrugations 71, which has a tendency to gradually retard the heat rising in the annealing furnace, and to further regulate the heat throughout the entire length of the annealing furnace sliding guides 72 are provided and which may be operated in any suitable manner not shown and which may be positioned as may be found convenient, in order to govern the heat passing through the annealing furnace.

The side walls of the annealing furnace at points where Figure 4 is taken on line 4—4 are provided with chambers 73 for the reception of burners 74. These burners may use oil gas, coal gas, or natural gas, pipes 75 conveying fuel from any suitable source not shown to the burners. Suitable closures 76 are provided for closing the chambers containing the burners. These closures may be held in position in any suitable manner.

The invention having been set forth, what is claimed is:

1. In an apparatus as set forth, the combination with a plurality of glass extruding outlets, of a supporting guide immediately under the plurality of outlets, said supporting guide having transverse abutments, a cutting frame in the supporting guide provided with transverse cutting knives, between the cutting edges of which and the abutments the extruded glass passes, and pneumatic means operatively associated with the cutter frame for severing the glass.

2. In an apparatus as set forth, the combination with a plurality of glass extruding outlets for extruding the glass in sheets, of a support having guides immediately below the outlets and provided with transverse abutments, a cutter frame mounted in said guides and provided with transverse cutting knives for shearing actions across and over said outlets for cutting the glass into sheets when the glass extrudes between the abutments and the cutting edges of the knives, pneumatic means connected to both ends of the cutter frame for reciprocating the same.

3. In an apparatus as set forth, the combination with a plurality of glass extruding outlets for extruding the glass in sheets, of a support having guides immediately below the outlets and provided with transverse abutments, a cutter frame mounted in said guides and provided with transverse cutting knives for sheering actions across and over said outlets for cutting the glass into sheets when the glass extrudes between the abutments and the cutting edges of the knives, pneumatic means connected to both ends of the cutter frame for reciprocating the same, and means actuated by a moving element and operatively associated with the pneumatic means for reversing the action of the pneumatic means.

4. In an apparatus as set forth, the combination with a plurality of glass extruding outlets, of a supporting guide immediately under the plurality of outlets, said supporting guide having transverse abutments, a cutting frame in the supporting guide provided with transverse cutting knives, between the cutting edges of which and the abutments the extruded glass passes, and pneumatic means operatively associated with the cutter frame for severing the glass, an annealing furnace, a conveyor mounted in the annealing furnace and operating immediately below and adjacent the supporting guide, said conveyor having gripping means, and means on the side walls of the annealing furnace for actuating the gripping means to grip the sheets of glass immediately as they are cut.

5. In an apparatus as set forth, the combination with a plurality of glass extruding outlets for extruding the glass in sheets, of a support having guides immediately below the outlets and provided with transverse abutments, a cutter frame mounted in said guides and provided with transverse cutting knives for shearing actions across and over said outlets for cutting the glass into sheets when the glass extrudes between the abutments and the cutting edges of the knives, pneumatic means connected to both ends of the cutter frame for reciprocating the same, an annealing furnace, a conveyor therein, and operable immediately below and adjacent the support, said conveyor having fixed and movable gripping bars for gripping the sheets of glass immediately after being severed, and means on the side walls of the annealing furnace for actuating the movable gripping bars.

6. In an apparatus as set forth, the combination with a plurality of glass extruding outlets for extruding the glass in sheets, of a support having guides immediately below the outlets and provided with transverse abutments, a cutter frame mounted in said guides and provided with transverse cutting knives for shearing actions across and over said outlets for cutting the glass into sheets when the glass extrudes between the abutments and the cutting edges of the knives, pneumatic means connected to both ends of the cutter frame for reciprocating the same, an annealing furnace, a conveyor therein, and operable immediately below and adjacent the support said conveyor having fixed and movable gripping bars for gripping the sheets of glass immediately after being severed, and means on the side walls of the annealing furnace for actuating the movable gripping bars, and said gripping means being automatically releasable, whereby the sheets of glass may be released at the end of their travel.

7. In an apparatus for the manufacture of sheet plate glass, the combination with an annealing furnace including a pot for molten glass, a plurality of glass extruding outlets constructed in the wall between the pot and the annealing furnace for extruding glass in sheets, means immediately below the outlets and adjacent thereto including a cutter frame for severing the glass into sheets, means at both ends of the cutter frame and pneumatically reciprocating the same, a conveyor immediately below and adjacent the cutting means and having gripping means for the sheets of glass whereby they may be carried the full length of the annealing furnace, a conveyor at one end of the furnace remote from the severing mechanism and positioned laterally to the furnace for conveying the sheets of glass laterally from the furnace, and means operatively associated with both conveyors for actuating them alternately with each other and each alternately with the severing of the sheets of glass, means on the opposite walls of the annealing furnace for retaining the gripping means actuated the full travel of the first conveyor, said gripping means being automatically released at the point where the means on the side walls terminate, whereby the sheets of glass are deposited on the second conveyor.

8. In an apparatus for the manufacture of sheet plate glass, the combination with an annealing furnace including a pot for molten glass, a plurality of glass extruding outlets constructed in the wall between the pot and the annealing furnace for extruding glass in sheets, means immediately below the outlets and adjacent thereto including a cutter frame for severing the glass into sheets, means at both ends of the cutter frame and pneumatically reciprocating the same, a conveyor immediately below and adjacent the cutting means and having gripping means for the sheets of glass whereby they may be carried the full length of the annealing furnace, a conveyor at one end of the furnace remote from the severing mechanism and positioned laterally to the furnace for conveying the sheets of glass laterally from the furnace, and means operatively associated with both conveyors for actuating them alternately with each other and each alternately with the severing of the sheets of glass, means on the opposite walls of the annealing furnace for retaining the gripping means actuated the full travel of the conveyor, said gripping means being automatically released at the point where the means on the side walls terminate, whereby the sheets of glass are deposited on the second conveyor, and means in the path of and actuated by the second conveyor and associated with the pneumatic means for alternately actuating the cutter frame.

In testimony whereof he affixes his signature.

CHARLES J. JORDAN.